United States Patent
Yokoi

(10) Patent No.: US 12,291,429 B2
(45) Date of Patent: May 6, 2025

(54) AUXILIARY BRAKE FOR PASSENGER CONVEYORS

(71) Applicant: Mitsubishi Electric Corporation, Tokyo (JP)

(72) Inventor: Takanori Yokoi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 389 days.

(21) Appl. No.: 17/790,153

(22) PCT Filed: Apr. 10, 2020

(86) PCT No.: PCT/JP2020/016185
§ 371 (c)(1),
(2) Date: Jun. 30, 2022

(87) PCT Pub. No.: WO2021/205663
PCT Pub. Date: Oct. 14, 2021

(65) Prior Publication Data
US 2023/0038617 A1    Feb. 9, 2023

(51) Int. Cl.
*B66B 29/00* (2006.01)
*F16D 63/00* (2006.01)
*F16D 121/22* (2012.01)

(52) U.S. Cl.
CPC ............ *B66B 29/00* (2013.01); *F16D 63/006* (2013.01); *F16D 2121/22* (2013.01)

(58) Field of Classification Search
CPC ... B66B 29/00; F16D 63/006; F16D 2121/22; F16D 59/02; F16D 65/16
See application file for complete search history.

(56) References Cited

U.S. PATENT DOCUMENTS

| | | | |
|---|---|---|---|
| 5,202,539 | A | 4/1993 | Lamb |
| 2012/0073933 | A1 | 3/2012 | Senger |

FOREIGN PATENT DOCUMENTS

| | | | |
|---|---|---|---|
| CN | 104832573 | A | 8/2015 |
| JP | 2008-1470 | A | 1/2008 |
| JP | 2008-290846 | A | 12/2008 |
| JP | 2010-18419 | A | 1/2010 |

(Continued)

OTHER PUBLICATIONS

Japanese Patent No. JP 2006143424 to Nagaya published on Jun. 8, 2006.*

(Continued)

*Primary Examiner* — Pamela Rodriguez
(74) *Attorney, Agent, or Firm* — XSENSUS LLP

(57) ABSTRACT

There is provided an auxiliary brake of a passenger conveyor that can be easily released. The auxiliary brake of the passenger conveyor includes: a braking wheel comprising a groove on one side face, the groove being depressed in a direction of a rotation axis and having a face parallel to the rotation axis on one end, and the braking wheel being provided so as to rotate synchronously with a main axis of a sprocket of the passenger conveyor; and a pole having a shape of a rod and provided being movable in the direction of the rotation axis of the braking wheel, the pole being displaced between a first position of coming into contact with any face of the groove and a second position of not coming into contact with any face of the groove.

8 Claims, 4 Drawing Sheets

(56) References Cited

FOREIGN PATENT DOCUMENTS

| | | | |
|---|---|---|---|
| JP | 2012-530024 | A | 11/2012 |
| JP | 2013-163558 | A | 8/2013 |
| JP | 2017-30882 | A | 2/2017 |
| JP | 2019-59557 | A | 4/2019 |

OTHER PUBLICATIONS

Japanese Patent No. JP 2016102019 to Hara published on Jun. 2, 2016.*
WO document No. WO 2020054065 to Yokoi published on Mar. 19, 2020.*
Chinese Patent No. CN 115367600 to Yokoi published on Nov. 22, 2022.*
International Search Report mailed on Jun. 23, 2020, received for PCT Application PCT/JP2020/016185, filed on Apr. 10, 2020, 6 pages including English Translation.
Office Action issued Jan. 9, 2025 in corresponding Chinese Patent Application No. 202080098830.6.

* cited by examiner

FIG. 2
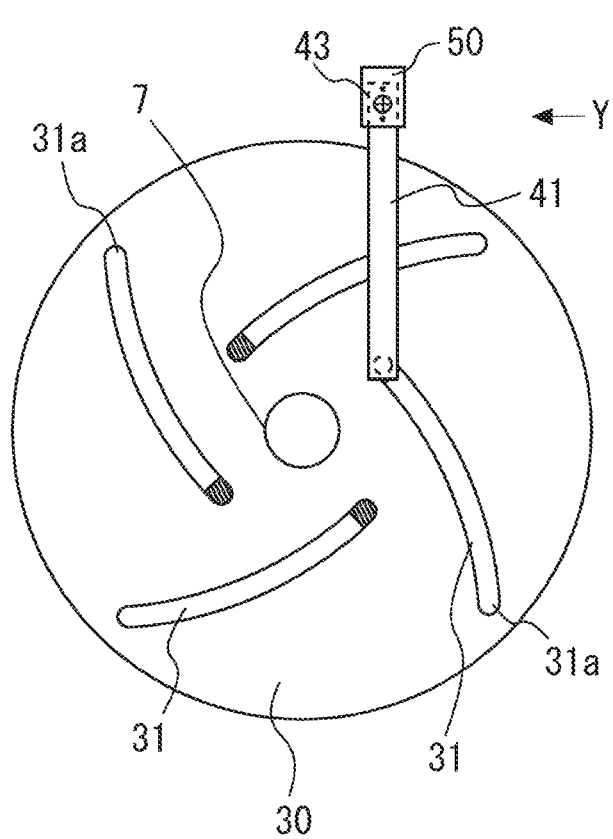
FIG. 2A
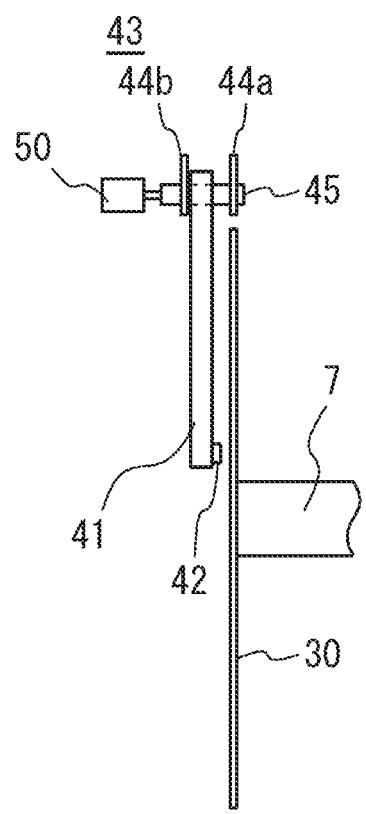
FIG. 2B

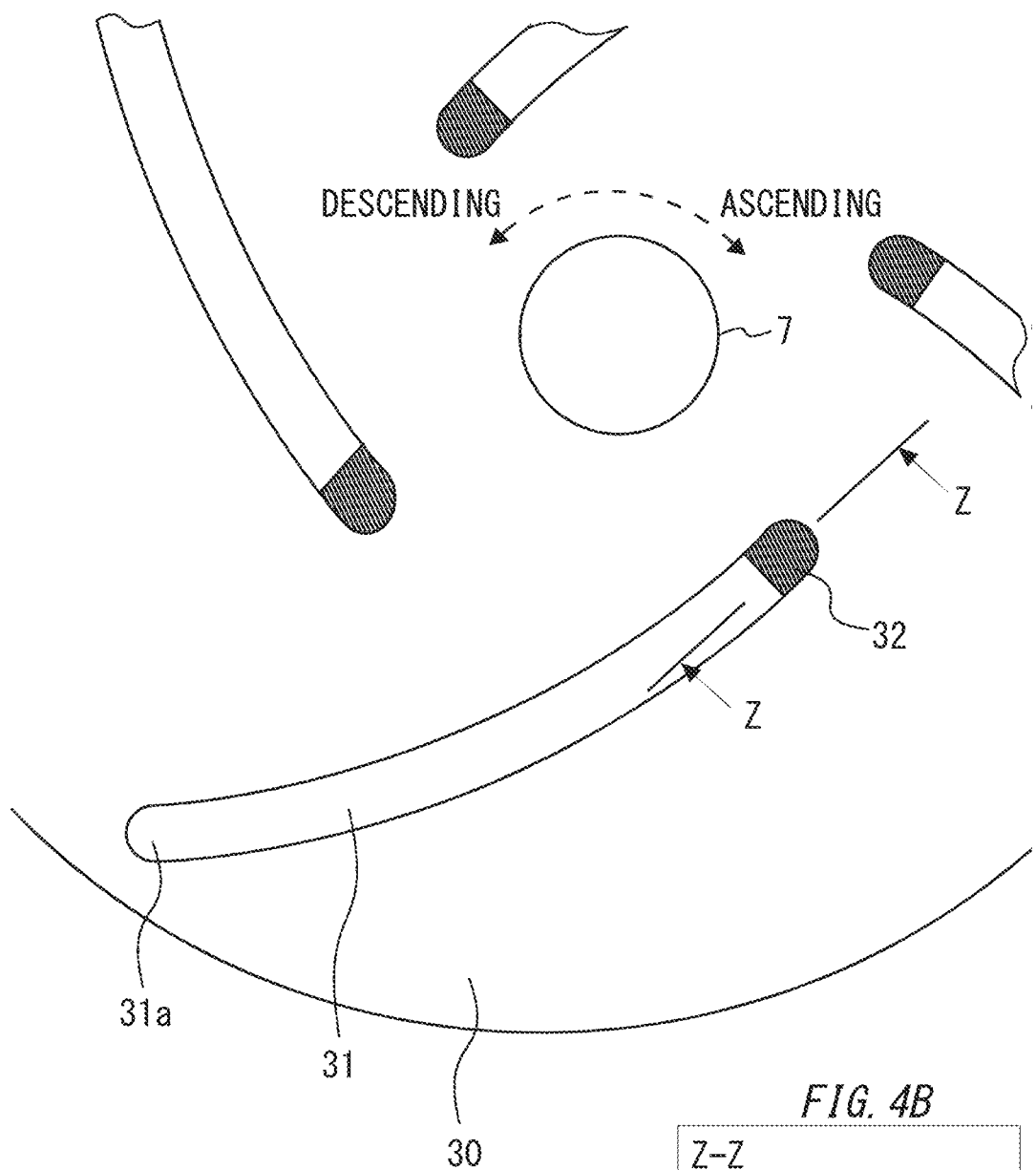
FIG. 4
FIG. 4A
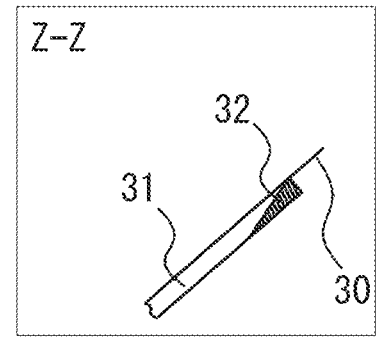
FIG. 4B

AUXILIARY BRAKE FOR PASSENGER CONVEYORS

CROSS-REFERENCE TO RELATED APPLICATION

The present application is based on PCT filing PCT/JP2020/016185, filed Apr. 10, 2020, the entire contents of which are incorporated herein by reference.

FIELD

The present invention relates to an auxiliary brake for passenger conveyors.

BACKGROUND

PTL 1 discloses an auxiliary brake of a passenger conveyor. Thereby, even if a trouble occurs in a main brake of a passenger conveyor, steps can be stopped.

CITATION LIST

Patent Literature

[PTL 1] JP 2013-163558 A

SUMMARY

Technical Problem

As for the auxiliary brake of the passenger conveyor described in PTL 1, however, it is necessary for a worker to perform a release operation while confirming movement of the auxiliary brake after braking operation is performed. Therefore, it is not possible to easily release the auxiliary brake.

The present disclosure has been made to solve the above problem. An object of the present disclosure is to provide an auxiliary brake of a passenger conveyor that can be easily released.

Solution to Problem

An auxiliary brake of a passenger conveyor according to the present disclosure includes: a braking wheel comprising a groove on one side face, the groove being depressed in a direction of a rotation axis and having a face parallel to the rotation axis on one end, and the braking wheel being provided so as to rotate synchronously with a main axis of a sprocket of the passenger conveyor; and a pole having a shape of a rod and provided being movable in the direction of the rotation axis of the braking wheel, the pole being displaced between a first position of coming into contact with any face of the groove and a second position of not coming into contact with any face of the groove.

Advantageous Effects of Invention

According to the present disclosure, an auxiliary brake of a passenger conveyor is provided with a pole provided being moving in a direction of a rotation axis of a braking wheel. Therefore, it is possible to easily release the auxiliary brake.

BRIEF DESCRIPTION OF DRAWINGS

FIG. 2A shows diagram showing an auxiliary brake of the passenger conveyor in the first embodiment.

FIG. 2B shows diagram showing an auxiliary brake of the passenger conveyor in the first embodiment.

FIG. 4A is a diagram showing a braking wheel for the passenger conveyor in the first embodiment.

FIG. 4B is a diagram showing a braking wheel for the passenger conveyor in the first embodiment.

DESCRIPTION OF EMBODIMENT

Figure 1:
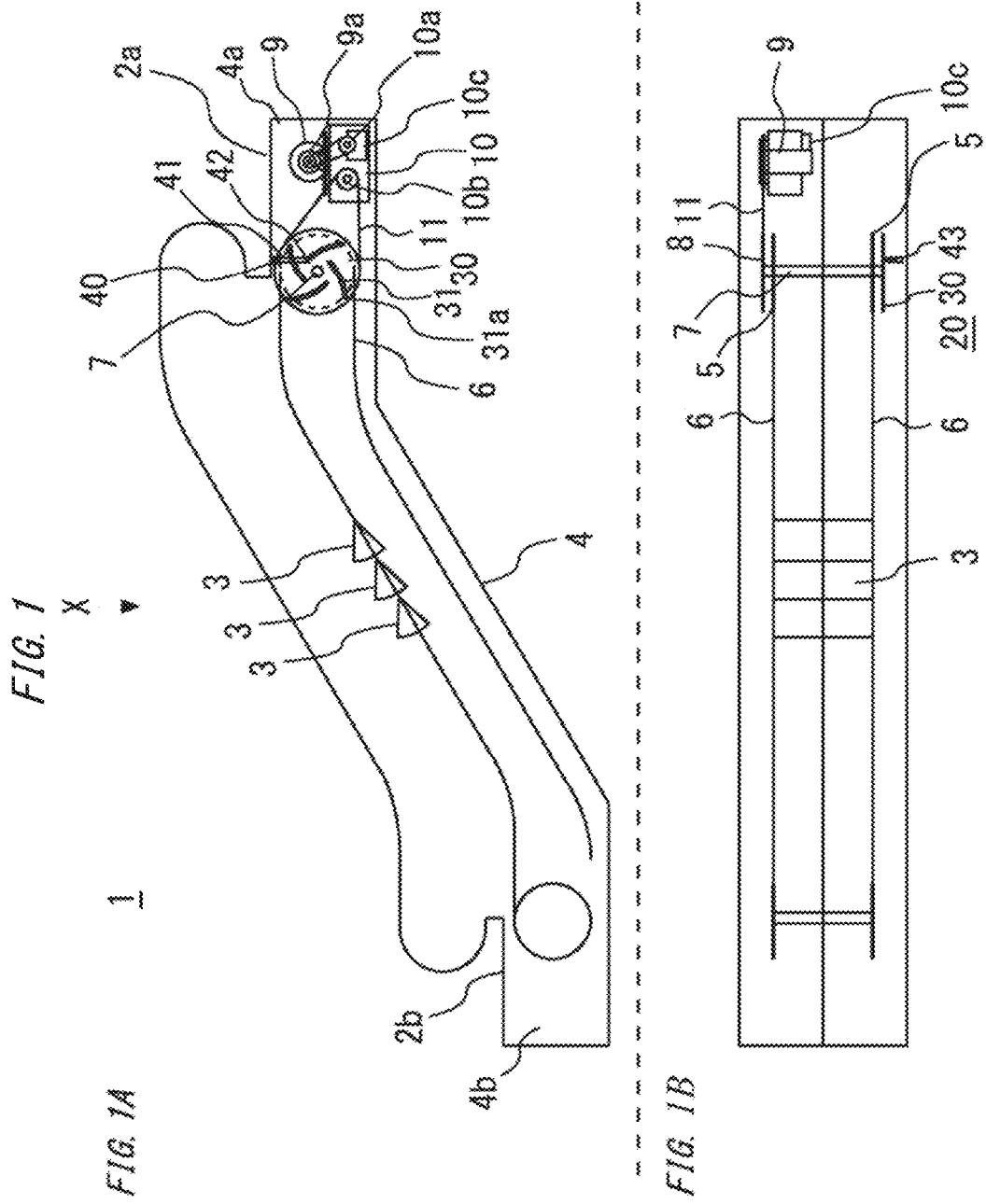
FIG. 1A shows configuration diagram of a passenger conveyor in a first embodiment.
FIG. 1B shows configuration diagram of a passenger conveyor in a first embodiment.

An embodiment for practicing the present disclosure will be described according to accompanying drawings. In the drawings, the same or corresponding portions will be given the same reference sign. Duplicated description of the portions will be appropriately simplified or omitted.

First Embodiment

FIGS. 1A and 1B show configuration diagram of a passenger conveyor in a first embodiment. FIG. 1B is an X arrow view of FIG. 1A.

In FIGS. 1A and 1B, a passenger conveyor 1 is an escalator.

The passenger conveyor 1 is provided with a first entrance/exit 2a, a second entrance/exit 2b, a plurality of steps 3, a main frame 4, a pair of step sprockets 5, a pair of step chains 6, a main shaft 7, a driving sprocket 8, a motor 9, a decelerator 10, a drive chain 11, an auxiliary brake 20 and a control panel not shown.

The passenger conveyor 1 is provided between the upstairs and the downstairs of a building not shown. The passenger conveyor 1 transports passengers between the upstairs and the downstairs.

The first entrance/exit 2a is provided on the upstairs of the building. Users pass through the first entrance/exit 2a to use the passenger conveyor 1. The second entrance/exit 2b is provided on the downstairs of the building. Users pass through the second entrance/exit 2b to use the passenger conveyor 1.

All the plurality of steps 3 are coupled in a ring shape. The plurality of steps 3 are provided between the first entrance/exit 2a and the second entrance/exit 2b.

The main frame 4 is provided with an upper machine room 4a and a lower machine room 4b. The main frame 4 is provided between the first entrance/exit 2a and the second entrance/exit 2b.

The upper machine room 4a is provided on an upper end portion of the main frame 4. The upper machine room 4a is provided below the first entrance/exit 2a. The lower machine room 4b is provided on a lower end portion of the main frame 4. The lower machine room 4b is provided below the second entrance/exit 2b.

For example, each of the paired step sprockets 5 is provided in the upper machine room 4a.

Each of the paired step chains 6 is an endless chain. For example, each of the paired step chains 6 is a roller chain. One of the paired step chains 6 couples one side of each of the plurality of steps 3. The other of the paired step chains 6 couples the other side of each of the plurality of steps 3. The paired step chains 6 are wound around the paired step sprockets 5 respectively to be capable of moving following rotation of the paired step sprockets 5.

For example, the main shaft 7 is provided in the upper machine room 4a. The main shaft 7 is connected to the pair of step sprockets 5 to be capable of rotating synchronously.

The driving sprocket 8 is connected to the main shaft 7 to be capable of rotating synchronously.

The motor 9 is provided with a driving pulley 9a. For example, the motor 9 is provided in the upper machine room 4a. The motor 9 is a device that generates driving force to cause the driving pulley 9a to rotate.

The decelerator 10 is provided with a driven pulley 10a, an output shaft 10b and a main brake 10c. The decelerator 10 is provided adjacent to the motor 9. The decelerator 10 is a device that causes rotation of the driven pulley 10a to be transmitted to the output shaft 10b.

For example, the driven pulley 10a is connected to the driving pulley 9a via an endless belt. The endless belt transmits rotational driving force of the driving pulley 9a to the driven pulley 10a as rotational driving force.

The main brake 10c brakes rotation of the output shaft 10b.

The drive chain 11 is an endless chain. For example, the drive chain 11 is a roller chain. One end of the drive chain 11 is wound around the output shaft 10b to be capable of moving following rotation of the output shaft 10b. The other end of the drive chain 11 is wound around the driving sprocket 8 to be capable of transmitting rotational driving force of the output shaft 10b.

The auxiliary brake 20 is provided with a braking wheel 30 and a braking device 40.

For example, the braking wheel 30 has a shape of a disk. The braking wheel 30 is provided with a plurality of grooves 31 on one side face. For example, the braking wheel 30 is provided with four grooves 31. The braking wheel 30 is provided on one side of one of the paired step sprockets 5. The braking wheel 30 is provided such that the other side face of the braking wheel 30 faces one side face of the one of the paired step sprockets 5. The braking wheel 30 is connected to the main shaft 7 to be capable of rotating synchronously.

Each of the plurality of grooves 31 has such a shape that is depressed in a direction of a rotation axis of the braking wheel 30 from the one side surface of the braking wheel 30. Each of the plurality of grooves 31 is provided with a stopping portion 31a on one end. For example, each of the plurality of grooves 31 has a circular arc shape, with the one end provided near the circumference of the braking wheel 30 and the other end provided near the center of the braking wheel 30 as both ends.

For example, each stopping portion 31a has a stopping face parallel to the rotation axis of the braking wheel 30, between the bottom face of the groove 31 and the one side surface of the braking wheel 30.

The braking device 40 is provided with a pole 41. For example, the braking device 40 is provided on the one side of the braking wheel 30.

The braking device 40 causes the position of the pole 41 to be displaced. The braking device 40 causes the pole 41 to be displaced to a first position near the one side face. The braking device 40 causes the pole 41 to be displaced to a second position more away from the braking wheel 30 than the first position.

For example, the pole 41 has a shape of a rod. The pole 41 is provided with a projection 42.

The pole 41 is provided being movable in the direction of the rotation axis of the braking wheel 30. The pole 41 is provided such that the projection 42 faces the one side face of the braking wheel 30. The pole 41 is provided such that the projection 42 can come into contact with a face of any of the plurality of grooves 31 when the pole 41 exists at the first position. The pole 41 causes the projection 42 to be closely in contact with the one side surface of the braking wheel 30 when existing at the first position.

For example, the projection 42 has a cylindrical shape. When the pole 41 exists at the first position, the projection 42 is in any one state between the state of being closely in contact with the one side surface of the braking wheel 30 and the state of being in contact with the face of any of the plurality of grooves 31. When the pole 41 exists at the second position, the projection 42 does not come into contact with the braking wheel 30.

For example, the control panel not shown is provided in the upper machine room 4a. The control panel controls operation of the motor 9. For example, the control panel controls operation of the main brake 10c. For example, the control panel controls operation of the auxiliary brake 20.

For example, when the plurality of steps 3 that are moving are to be stopped during regular operation, the main brake 10c causes the plurality of steps 3 to stop by braking rotation of the main shaft 7.

For example, there may be a case where such an abnormal situation of the passenger conveyor 1 occurs that the drive chain 11 has broken, that the operation speed or operation direction does not follow control of the control panel, that power is not supplied due to power failure, or the like. For example, when an abnormal situation occurs, the auxiliary brake 20 causes the plurality of steps 3 to stop by braking rotation of the main shaft 7. For example, when an abnormal situation occurs, the auxiliary brake 20 causes the plurality of steps 3 to stop by braking rotation of the main shaft 7 together with the main brake 10c. At this time, in order to prevent the plurality of steps 3 from suddenly reducing the speed, the auxiliary brake 20 starts braking of rotation of the main shaft 7 after a predetermined time passes after the main brake 10c performs braking operation.

When an abnormal situation occurs, the auxiliary brake 20 works. When the auxiliary brake 20 works, the braking device 40 causes the pole 41 to be displaced from the second position to the first position.

After that, for example, the projection 42 comes into close contact with the one side surface of the braking wheel 30. By the braking wheel 30 rotating, the position of the close contact between the projection 42 and the braking wheel 30 changes. When the position of the close contact between the projection 42 and the braking wheel 30 corresponds to any one of the plurality of grooves 31, the projection 42 comes into contact with any face of the groove 31.

After that, by the braking wheel 30 rotating, the projection 42 moves in the inner area of the groove 31. The projection 42 moves in the inner area of the groove 31 until the projection 42 comes into contact with the stopping face.

When the projection 42 and the stopping face come into contact with each other, rotation of the braking wheel 30 is braked by the braking device 40 by the stopping face being caught by the projection 42. The braking wheel 30 brakes rotation of the main shaft 7.

After a predetermined adjustment time passes after the auxiliary brake 20 works, the rotation of the main shaft 7 is braked. The length of the adjustment time changes according to the shape of the plurality of grooves 31.

After that, by the braking device 40 causing the pole 41 to move from the first position to the second position, the auxiliary brake 20 releases the braking.

Next, a configuration of the auxiliary brake 20 will be described using FIGS. 2A, 2B and 3.

FIGS. 2A and 2B show diagram showing an auxiliary brake of the passenger conveyor in the first embodiment. FIG. 3 is a diagram showing the auxiliary brake of the passenger conveyor in the first embodiment. FIG. 2B is a Y arrow view of FIG. 2A.

Figure 3:
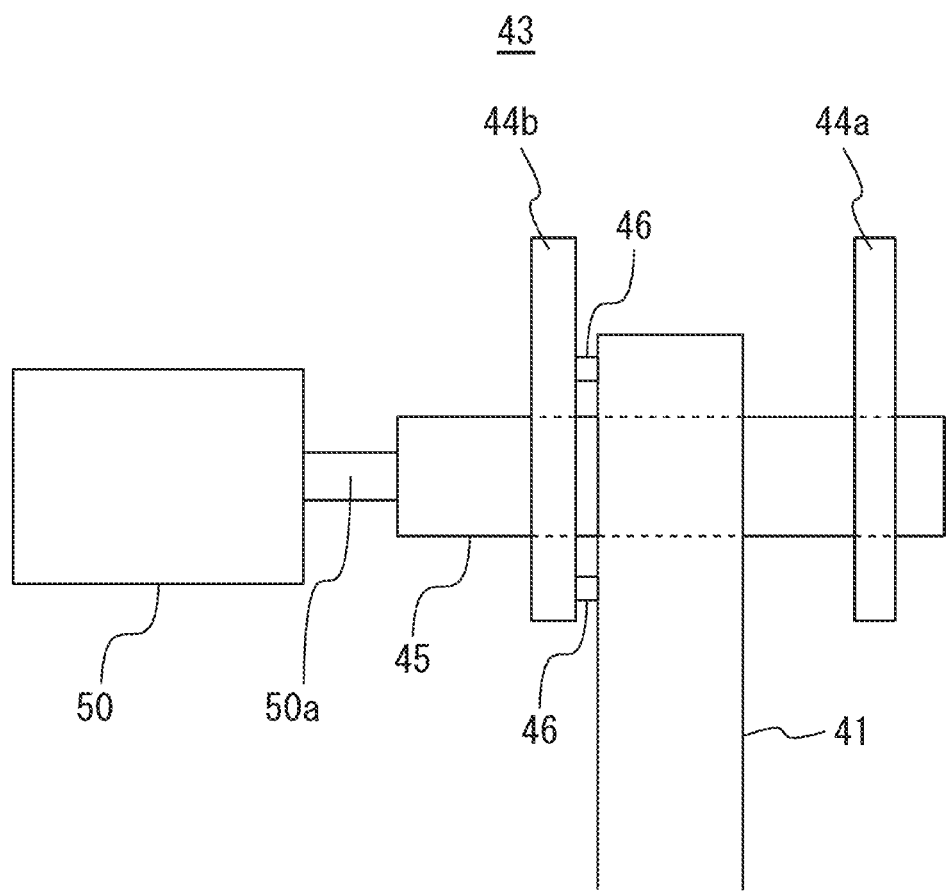
FIG. 3 is a diagram showing the auxiliary brake of the passenger conveyor in the first embodiment.

As shown in FIGS. 2A, 2B and 3, the braking device 40 is provided with the pole 41, the projection 42, a displacement member 43 and a solenoid 50.

For example, the displacement member 43 is provided with a first support member 44a, a second support member 44b, a pole rotation shaft 45 and a plurality of coil springs 46. The displacement member 43 is connected to the pole 41.

The displacement member 43 gives the pole 41 external force in such a direction that the pole 41 moves toward the first position.

For example, the first support member 44a has a shape of a plate. For example, the first support member 44a has a circular hole in the center. The first support member 44a is provided above the braking wheel 30. The first support member 44a is provided such that the central axis of the circular hole is parallel to the rotation axis of the braking wheel 30. On side face of the first support member 44a exists on the same plane as the one side face of the braking wheel 30.

For example, the second support member 44b has a shape of a plate. For example, the second support member 44b has a circular hole in the center. The second support member 44b is provided on the one side of the first support member 44a. The central axis of the circular hole of the second support member 44b is coaxial with the hole of the first support member 44a.

For example, the pole rotation shaft 45 has a cylindrical shape. The pole rotation shaft 45 is connected to the pole 41. For example, the pole rotation shaft 45 is provided such that its longitudinal direction is vertical to the longitudinal direction of the pole 41.

The pole rotation shaft 45 is inserted through the hole of the first support member 44a and the hole of the second support member 44b. The pole rotation shaft 45 is freely rotatably supported by the first support member 44a and the second support member 44b.

The plurality of coil springs 46 have elasticity. For example, the plurality of coil springs 46 are provided between the pole 41 and the second support member 44b. For example, one end of each of the plurality of coil springs 46 is connected to the pole 41. For example, the other end of each of the plurality of coil springs 46 faces the second support member 44b. For example, the plurality of coil springs 46 give the pole 41 external force in such a direction that the pole 41 moves toward the first position.

The solenoid 50 is provided with a movable shaft 50a. For example, the solenoid 50 is provided on the other side of the second support member 44b. The solenoid 50 is connected to a power source not shown.

The solenoid 50 gives the movable shaft 50a external force using electromagnetic force. For example, when a current flows through the solenoid 50, the solenoid 50 gives the movable shaft 50a the external force in one direction. When a current does not flow, the solenoid 50 does not give the movable shaft 50a the external force.

For example, the movable shaft 50a has a cylindrical shape. The movable shaft 50a is connected to the pole rotation shaft 45. For example, the movable shaft 50a is provided such that its central axis is coaxial with the rotation axis of the pole rotation shaft 45.

The braking device 40 causes the position of the pole 41 to be displaced using the displacement member 43 and the solenoid 50.

The displacement member 43 always gives the pole 41 the external force in the direction in which the pole 41 moves toward the first position.

When a current flows through the solenoid 50, the solenoid 50 gives the pole 41 external force in such a direction that the pole 41 is displaced to the second portion, via the pole rotation shaft 45. The pole 41 is held at the second position by the solenoid 50. The second position is a position where the external force the pole 41 receives from the displacement member 43 and the external force the pole 41 receives from the solenoid 50 are balanced with each other.

When a current does not flow through the solenoid 50, the solenoid 50 does not give the pole 41 the external force. The pole 41 is held at the first position by the displacement member 43. For example, the first position is a position where the pole 41 and the first support member 44a come into contact with each other.

Next, an inclination that each of the plurality of grooves 31 has will be described using FIGS. 4A and 4B.

FIGS. 4A and 4B are diagrams showing a braking wheel for the passenger conveyor in the first embodiment. In FIG. 4B, a Z-Z section of the braking wheel 30 in FIG. 4A is shown.

In FIG. 4A, an ascending direction is a clockwise rotation direction around the main shaft 7. A descending direction is a counterclockwise rotation direction around the main shaft 7.

As shown in FIG. 4B, each of the plurality of grooves 31 has an inclined face 32.

The inclined face 32 is provided between the bottom face of each of the plurality of grooves 31 and the one side surface of the braking wheel 30. For example, the inclined face 32 smoothly connects the bottom face of each of the plurality of grooves 31 and the one side surface of the braking wheel 30. For example, the inclined face 32 is provided on the other end of each of the plurality of grooves 31.

When the projection 42, which is not shown in FIGS. 4A and 4B, comes into contact with a face of any of the plurality of grooves 31 in a state of the braking wheel 30 rotating in the ascending direction, the projection 42 moves its position from the bottom face of the groove 31 to the inclined face 32. After that, the position of the projection 42 moves its position from the inclined face 32 to the one side surface of the braking wheel 30. The auxiliary brake 20 does not brake rotation of the main shaft 7.

When the projection 42, which is not shown in FIGS. 4A and 4B, comes into contact with a face of any of the plurality of grooves 31 in a state of the braking wheel 30 rotating in the descending direction, the projection 42 is caught by the stopping face of the stopping portion 31a of the groove 31. The projection 42 stops at the stopping portion 31a. The auxiliary brake 20 brakes rotation of the main shaft 7.

According to the first embodiment described above, the auxiliary brake 20 is provided with the braking wheel 30 and the pole 41. The braking wheel 30 has the plurality of grooves 31 depressed in the direction of the rotation axis on one side face. Each of the plurality of grooves 31 has a face parallel to the rotation axis on one end. The braking wheel 30 is provided on one side of one of the paired step sprockets 5 of the passenger conveyor 1. The braking wheel 30 is provided so as to rotate synchronously with the main shaft 7. The pole 41 has a shape of a rod. The pole 41 is provided with the projection 42 that faces the one side face of the braking wheel 30. The pole 41 is provided being movable in the direction of the rotation axis of the braking wheel 30. The pole 41 is provided so as to be displaced between the first position and the second position. At the first position, the pole 41 comes into contact with a face of any of the plurality of grooves 31 via the projection 42. At the second position, the pole 41 does not come into contact with a face of any of the plurality of grooves 31 via the projection 42. Therefore, braking of the auxiliary brake 20 can be released by causing the pole 41 to be displace from the first position to the second position. The auxiliary brake 20 can be released regardless of the rotation state of the braking wheel 30. As a result, it is possible to easily release the auxiliary brake 20.

Further, the braking wheel 30 is provided with the plurality of grooves 31 each of which is in a shape extending from the circumference side of the braking wheel 30 to the center side of the braking wheel 30. Therefore, for example, the projection 42 always comes into contact with each of the plurality grooves 31 at the other end of the groove 31 first. It is possible to cause the length of time required until the projection 42 comes into contact with one face of any of the plurality of grooves 31 and stops at the stopping portion 31a to be always the same. As a result, it is possible to change time required to brake rotation of the main shaft 7 after the auxiliary brake 20 works, by changing the shape of the plurality of grooves 31.

Further, the auxiliary brake 20 is provided with the displacement member 43 and the solenoid 50. The displacement member 43 gives the pole 41 external force in such a direction that the pole 41 is displaced to the first position. By a current flowing the solenoid 50, the solenoid 50 gives the pole 41 external force in such a direction that the pole 41 is displaced to the second position. Therefore, the auxiliary brake 20 can switch between braking operation and release based on whether a current flows through the solenoid 50 or not. As a result, it is possible to use the auxiliary brake 20 in case of power failure. Further, it is possible to automatically release the auxiliary brake 20 not through a worker.

Further, the braking wheel 30 has the inclined face 32 provided between the bottom face of each of the plurality of grooves 31 and the one side surface of the braking wheel 30. Therefore, when the braking wheel 30 is rotating in the ascending direction, the auxiliary brake 20 does not brake the main shaft 7. As a result, it is possible to limit braking operation in only one direction.

Note that the pole 41 may not be provided on the one side of the braking wheel 30 if braking works by the pole 41 being displaced in the direction of a rotation axis of the braking wheel 30. For example, the pole 41 is provided on the other side of the braking wheel 30. In this case, the plurality of grooves 31 are provided on the other side face of the braking wheel 30. The displacement member 43 gives the pole 41 external force in such a direction that the pole 41 moves in one direction. The solenoid 50 gives the pole 41 external force in such a direction that the pole 41 moves in the other direction.

Note that the rotation direction of the braking wheel 30 in which the auxiliary brake 20 can brake the main shaft 7 is not limited to the descending direction. By changing the shape of the plurality of grooves 31, the rotation direction in which the auxiliary brake 20 can brake the main shaft 7 is changed. For example, each of the plurality of grooves 31 is provided with the stopping portions 31a on one end and the other end. In this case, the auxiliary brake 20 brakes the main shaft 7 regardless of the rotation direction of the braking wheel 30.

INDUSTRIAL APPLICABILITY

As described above, the auxiliary brake of the passenger conveyor according to the present disclosure can be used for passenger conveyors.

REFERENCE SIGNS LIST

1 Passenger conveyor
2a First entrance/exit
2b Second entrance/exit
3 Step
4 Main frame
4a Upper machine room
4b Lower machine room
5 Step sprocket
6 Step chain
7 Main shaft
8 Driving sprocket
9 Motor
9a Driving pulley
10 Decelerator
10a Driven pulley
10b Output shaft
10c Main brake
11 Drive chain
20 Auxiliary brake
30 Braking wheel
31 Groove
31a Stopping portion
32 Inclined face
40 Braking device
41 Pole
42 Projection
43 Displacement member
44a First support member
44b Second support member
45 Pole rotation shaft
46 Coil spring
50 Solenoid
50a Movable shaft

The invention claimed is:

1. An auxiliary brake of a passenger conveyor comprising:
   a braking wheel comprising a groove on one side face, the groove being depressed in a direction of a rotation axis and having a face parallel to the rotation axis on one end, and the braking wheel being provided so as to rotate synchronously with a main axis of a sprocket of the passenger conveyor; and
   a pole having a shape of a rod and provided being movable in the direction of the rotation axis of the braking wheel, the pole being displaced between a first position of coming into contact with any face of the groove and a second position of not coming into contact with any face of the groove.

2. The auxiliary brake of the passenger conveyor according to claim 1, wherein
   the braking wheel comprises the groove in a shape extending from a circumference side to a center side.

3. The auxiliary brake of the passenger conveyor according to claim 2, comprising:
   a displacement member giving the pole external force in such a direction that the pole is displaced to the first position; and a solenoid giving the pole external force in such a direction that the pole is displaced to the second position, by a current flowing through the solenoid.

4. The auxiliary brake of the passenger conveyor according to claim 3, wherein
the braking wheel has an inclined face provided between a bottom face of the groove and the one side face of the braking wheel.

5. The auxiliary brake of the passenger conveyor according to claim 2, wherein
the braking wheel has an inclined face provided between a bottom face of the groove and the one side face of the braking wheel.

6. The auxiliary brake of the passenger conveyor according to claim 1, comprising:
a displacement member giving the pole external force in such a direction that the pole is displaced to the first position; and
a solenoid giving the pole external force in such a direction that the pole is displaced to the second position, by a current flowing through the solenoid.

7. The auxiliary brake of the passenger conveyor according to claim 6, wherein
the braking wheel has an inclined face provided between a bottom face of the groove and the one side face of the braking wheel.

8. The auxiliary brake of the passenger conveyor according to claim 1, wherein
the braking wheel has an inclined face provided between a bottom face of the groove and the one side face of the braking wheel.

\* \* \* \* \*